US008862369B2

(12) United States Patent
Vitiello et al.

(10) Patent No.: US 8,862,369 B2
(45) Date of Patent: Oct. 14, 2014

(54) METHOD FOR CONTROLLING AN EGR CIRCUIT OF A MOTOR VEHICLE ENGINE, VALVE FOR IMPLEMENTING SAID METHOD, AND ENGINE HAVING SAID VALVE

(75) Inventors: Nicolas Vitiello, Paris (FR); Sébastien Potteau, Beaumont sur Vesle (FR); Sébastien Adenot, Pontoise (FR); Grégory Hodebourg, Sartrouville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 292 days.

(21) Appl. No.: 13/518,113

(22) PCT Filed: Dec. 22, 2010

(86) PCT No.: PCT/EP2010/070559
§ 371 (c)(1),
(2), (4) Date: Oct. 2, 2012

(87) PCT Pub. No.: WO2011/076876
PCT Pub. Date: Jun. 30, 2011

(65) Prior Publication Data
US 2013/0025575 A1 Jan. 31, 2013

(30) Foreign Application Priority Data

Dec. 22, 2009 (FR) .................................... 09 06247

(51) Int. Cl.
*F02M 25/07* (2006.01)
*F16K 11/14* (2006.01)
(Continued)

(52) U.S. Cl.
CPC ........ *F02D 41/0077* (2013.01); *F02M 25/0798* (2013.01); *F02M 25/0786* (2013.01); *F16K* (Continued)

(58) Field of Classification Search
USPC .............. 123/568.12, 568.18, 568.2; 701/108
See application file for complete search history.

(56) References Cited

U.S. PATENT DOCUMENTS

| 4,027,636 A | 6/1977 | Yamamoto et al. |
| 7,987,837 B2 * | 8/2011 | Lupescu et al. ............ 123/568.2 |

(Continued)

FOREIGN PATENT DOCUMENTS

| EP | 0 992 668 A2 | 4/2000 |
| EP | 1 136 688 A2 | 9/2001 |

(Continued)

OTHER PUBLICATIONS

International Search Report w/translation from PCT/EP2010/070559 dated Mar. 28, 2011 (6 pages).

*Primary Examiner* — Erick Solis
(74) *Attorney, Agent, or Firm* — Osha Liang LLP

(57) ABSTRACT

The invention relates to a method for controlling an exhaust gas recirculation circuit (2c) for an internal combustion engine (M) of a motor vehicle. The engine (M) is linked to an air intake circuit (2a) and to a gas exhaust circuit (2b) linked to the air intake circuit (2a) by the recirculation circuit (2c). A first valve (15) controls the flow of air upstream from the recirculation circuit (2c), and gases that are recirculated within the a second valve (16) controls the flow of exhaust recirculation circuit (2c). In the method of the invention, the recirculation of the exhaust gases is in particular controlled by means of measuring a pressure difference across the terminals of the second valve (16). The method comprises the following steps: a) the first and second valves (15, 16) are closed, the first valve (15) being arranged so as to allow, in a closed position, the passage of an air leak current; b) the first and second valves (15, 16) are concomitantly opened so as to provide a sufficient pressure difference across the terminals of the second valve (16) so as to enable the measurement of the pressure difference in the terminals thereof. Due to the invention, the pressure difference across the terminals of the second valve (16) remains sufficiently high so as to allow the efficient measurement of said pressure difference.

9 Claims, 5 Drawing Sheets

(51) Int. Cl.
  *F02D 11/10* (2006.01)
  *F02D 41/00* (2006.01)
  *F02D 21/08* (2006.01)
  *F02B 29/04* (2006.01)
  *F02B 37/00* (2006.01)

(52) U.S. Cl.
  CPC ........ 11/14 (2013.01); *F02D 11/10* (2013.01); *F02B 29/0418* (2013.01); *F02M 25/0709* (2013.01); *F02B 37/00* (2013.01); *F02M 25/0773* (2013.01); *F02D 2041/0017* (2013.01); *Y02T 10/47* (2013.01); *F02D 21/08* (2013.01)
  USPC ................. 701/108; 123/568.12; 123/568.18; 123/568.2

(56) References Cited

U.S. PATENT DOCUMENTS

| | | | |
|---|---|---|---|
| 8,166,957 B2 * | 5/2012 | Lupescu et al. | 123/568.21 |
| 8,381,520 B2 * | 2/2013 | Leroux et al. | 60/605.2 |
| 2003/0188727 A1 * | 10/2003 | van Nieuwstadt | 123/568.16 |
| 2005/0241702 A1 * | 11/2005 | Blomquist et al. | 137/625.31 |

FOREIGN PATENT DOCUMENTS

| | | |
|---|---|---|
| FR | 2 900 455 A1 | 11/2007 |
| FR | 2 926 114 A1 | 7/2009 |
| FR | 2 926 126 A1 | 7/2009 |
| JP | 53 044729 A | 4/1978 |
| JP | 2008 101579 A | 5/2008 |

\* cited by examiner

METHOD FOR CONTROLLING AN EGR CIRCUIT OF A MOTOR VEHICLE ENGINE, VALVE FOR IMPLEMENTING SAID METHOD, AND ENGINE HAVING SAID VALVE

The invention relates to a method of controlling an exhaust gas recirculation circuit of a motor vehicle internal combustion engine, to a three-way valve for implementing the method and to an engine comprising such a valve.

A motor vehicle internal combustion engine comprises a combustion chamber, generally formed by a plurality of cylinders, in which a mixture of oxidant and of fuel is burnt to generate the work of the engine. The oxidant contains air, which may or may not be compressed, depending on whether or not the engine has a compressor; when it is compressed, it is referred to as supercharging air. The air (often denoted "fresh air") may moreover be mixed with exhaust gases; these are referred to as recirculated exhaust gases, this mode of operation being typically known by those skilled in the art by the English-language acronym EGR, which stands for "Exhaust Gas Recirculation". The gases admitted to the combustion chamber are known as inlet gases; the inlet gases may therefore be made of fresh air alone, or of a mixture of fresh air and of exhaust gases; the flow rate of the inlet gases can be regulated by a valve of the butterfly-valve type which is controlled as a function of the extent to which the vehicle throttle pedal is depressed to regulate the engine speed.

In the case of an engine that has compression means such as a compressor or turbocompressor, the air is admitted to the engine intake circuit, is compressed by the compressor, is cooled and admitted to the cylinders where it is burnt with the fuel then removed via the exhaust lines. The exhaust gases drive a turbine, attached to the compressor and therewith forming the turbocompressor. The exhaust gas recirculation may be what is known as "low-pressure" recirculation, when performed on exhaust gases bled off after the turbine and re-injected before the compressor, or "high-pressure" recirculation when it is performed on gases bled off before the turbine and reinjected after the compressor; the two types of recirculation may be combined. By way of example, low-pressure recirculation makes it possible, in the case of a gasoline engine, to reduce the exhaust temperature (and therefore the fuel consumption because there is therefore no need to enrich the combustion mixture too greatly) and avoid the phenomena of pinging at high engine compression ratios; in the case of a diesel engine, it allows a reduction in pollution in order to meet environmental standards.

In the case of a low-pressure exhaust gas recirculation loop for example, a valve known as a "three-way valve" is generally provided to control the level of EGR, which means the proportion of recirculated exhaust gases in the total flow rate of inlet gas entering the engine. Such a three-way valve has two inlet ducts, one for the fresh air and the other for the recirculated exhaust gases (in what follows, the recirculated exhaust gases will sometimes be referred to as "EGR gases"); the EGR gases are generally cooled before they are mixed with the fresh air. The three-way valve also comprises an outlet duct communicating with the inlet ducts to receive the fresh air and/or the EGR gases; this outlet duct opens for example into the compressor from where the gases are guided into a cooler (or along a path bypassing this cooler) before being admitted to the engine. Of course, the three-way valve may be replaced by two simple valves one of them located in the fresh air intake duct and the other in the exhaust gas recirculation duct. The flow rate of gas passing through a valve is regulated by a shut-off means such as a shutter or a butterfly.

Whatever the type of valve chosen, the level of EGR is regulated by controlling the valves. For good regulation of the level of EGR it is appropriate for the valve control system to be slaved to various parameters measured in real time in the device; in particular, the valves may be controlled on the basis of a measurement of the flow rate of the gases passing through them or alternatively on the basis of the pressure difference across them.

In an engine of the diesel type, an air flow meter is mounted in the air intake circuit and the flow rate of gas admitted to the engine is also known; the difference between the inlet gas flow rate and the fresh air flow rate corresponds to the EGR gas flow rate and from this it is therefore easy to deduce the level of EGR.

In an engine of the gasoline engine type on the other hand, gaining access to the level of EGR is a more complicated matter because this type of engine is not generally fitted with an air flow meter. In order to determine the level of EGR it is possible to use a measurement of the difference in pressure between the upstream and downstream side of the valve of the EGR gas duct; knowledge of this pressure difference (combined with other parameters such as the temperature of the gases or the inlet gas flow rate) gives information regarding the level of EGR.

However, if it is desirable to avoid the use of overly accurate, which means to say overly expensive, pressure sensors for measuring this pressure difference, this pressure difference needs to be high enough that it can be measured by sensors of moderate sensitivity, typically of a sensitivity of between 15 and 200 millibar.

The invention seeks to propose a method for controlling an exhaust gas recirculation circuit that makes it easy to monitor the level of EGR.

Thus, the invention relates to a method of controlling an exhaust gas recirculation circuit of a motor vehicle internal combustion engine, the engine being connected to an air intake circuit and to an exhaust gas circuit connected to the air intake circuit by the recirculation circuit, a first valve regulating the airflow rate upstream of the recirculation circuit and a second valve regulating the flow rate of recirculated exhaust gases in the recirculation circuit, the exhaust gas recirculation being controlled notably by measuring a pressure difference across the second valve, the method being characterized in that it comprises the following steps:

a) the first and second valves are closed, the first valve being arranged to allow, when in the closed position, an air leak current to pass, b) the first and second valves are opened concomitantly so as to create enough of a pressure difference across the second valve that this pressure difference can be measured.

The invention is notable in that it proposes a particularly advantageous change to the way in which an exhaust gas recirculation loop is controlled. The prior art traditionally proposed progressive opening of the EGR valve followed by closure of the air valve in order to create a depression and increase the EGR flow rate; with such modes of operation, the pressure difference across the EGR valve was small. Conversely, the method of the invention proposes concomitant opening of the valves in order to create and maintain a sufficient pressure difference across the EGR valve. The invention is particularly advantageous for controlling the low-pressure exhaust gas recirculation of a gasoline engine, for the reasons given hereinabove.

According to one embodiment, the first and second valves are arranged in a three-way valve comprising an inlet port with the first valve, an inlet port with the second valve and an outlet port communicating directly or indirectly with an intake manifold that admits gas to the engine. Such an implementation is compact and easy to operate.

According to one embodiment, with the intake circuit comprising, downstream of the recirculation circuit, a third valve for regulating the flow rate of the gases admitted to the engine, said valve is operated in such a way as to compensate for the closure of the first valve. This third valve may traditionally be a valve of the butterfly valve type used for regulating engine speed.

According to one embodiment, the degree of opening of the first valve is substantially identical to the degree of opening of the second valve, whatever their degree of opening. In particular, such operation can be obtained by the concomitant driving of the valves by a single motor, the degree of opening of the valves being a linear function of the angular position of the drive shaft of the motor, irrespective of this position.

According to another embodiment, the method comprises three phases or modes of operation for the concomitant opening of the valves:
  a first phase in which the degree of opening of the first valve is substantially identical to the degree of opening of the second valve;
  a second phase in which the degree of opening of the first valve is greater than the degree of opening of the second valve, and
  a third phase in which the degree of opening of the first valve is constant and maximum for a plurality of possible degrees of opening of the second valve.

By way of intermediate product, the invention also relates to a three-way valve for implementing the control method set out hereinabove, the valve being intended to provide the connection between the gas intake circuit and the exhaust gas recirculation circuit, the valve comprising a first shutter for regulating the airflow rate, a second shutter for regulating the recirculated exhaust gas flow rate, and a single motor for driving the two shutters, the valve being characterized in that it comprises gearing connecting the motor to the shutters in order to drive them, the gearing comprising means of driving the first shutter, means of driving the second shutter and means of disengaging the second shutter.

According to one embodiment, the valve has three modes of operation:
  a first mode of operation in which the motor drives the opening or closing of the first shutter, the second shutter being immobile and closed;
  a second mode of operation in which both shutters are closed, and
  a third mode of operation in which the motor drives the concomitant opening or closing of the two shutters.

According to one embodiment in this case, the concomitant opening or closing of the two shutters has three phases or modes:
  a first phase (or mode) in which the rotation of the motor drives the opening or closing of the shutters to substantially identical degrees of opening;
  a second phase (or mode) in which the rotation of the motor drives the opening or closing of the shutters with the first shutter having a degree of opening greater than the degree of opening of the second shutter, and
  a third phase (or mode) in which the rotation of the motor drives the opening or closing of the second shutter, the first shutter being immobile and wide open.

The invention also relates to a motor vehicle internal combustion engine comprising a valve as set out hereinabove.

The invention will be better understood with the aid of the following description of the preferred embodiment of the control method, of the valve and of the engine of the invention, with reference to the attached plates of drawings in which.

Figure 1:
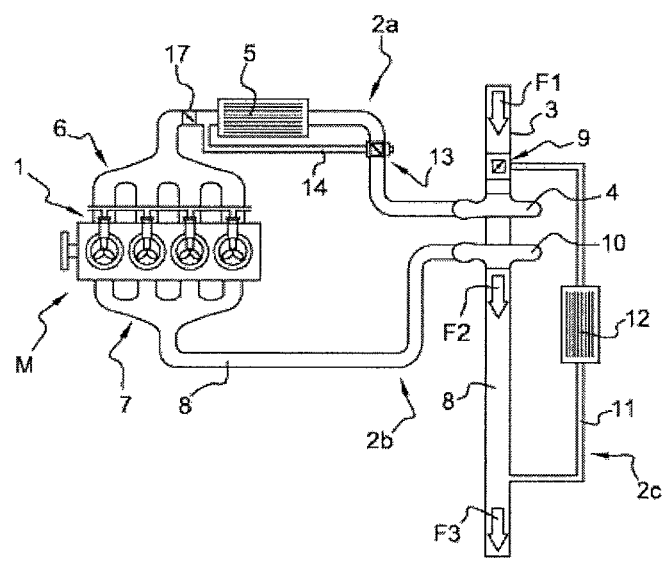
FIG. 1 is a schematic depiction of an engine and of its intake, exhaust and recirculation circuits.

With reference to FIG. 1, a motor vehicle internal combustion engine M comprises a combustion chamber 1 having a plurality of cylinders, in this instance four of these, and intended to receive a mixture of oxidant and of fuel (in this instance gasoline) of which the combustion in the cylinders generates the work of the engine M. The operation of the engine M is conventional: the gases are admitted to the combustion chamber 1, where they are compressed, burnt and then expelled in the form of exhaust gases; these are the conventional four strokes of a combustion engine (induction, compression, power and exhaust).

The intake circuit 2a that admits gases to the engine M comprises an air intake pipe 3 admitting charge air or fresh air (the flow of which is depicted by the arrow F1), a compressor 4 for the charge gases, which in this instance is a turbocompressor, and a heat exchanger 5, for cooling the gases leaving the compressor 4. This heat exchanger 5 is commonly known by those skilled in the art by its acronym "CAC" which stands for "charge air cooler"; its function is effectively to cool the inlet gases, particularly the air, which is said to be supercharged because it is compressed. On leaving the CAC 5, the gases enter an intake manifold 6 that admits the gases to the combustion chamber 1 of the engine M, forming a header box for the gases in the cylinder head of the engine M. In this particular instance, the intake circuit 2a comprises a bypass 14 bypassing the path containing the CAC 5, the gases entering the cooled path and those entering the uncooled path 14 being regulated by a valve 13, in a way known per se. Upstream of the intake manifold 6 that admits the gases to the engine M, the intake circuit comprises a valve comprising a shutter of the butterfly type, the function of which is to regulate the gas flow rate in order to regulate engine speed; this butterfly valve 17 is controlled by an engine control unit (typically denoted by its English-language acronym of ECU), well-known to those skilled in the art.

The gas exhaust circuit 2b comprises, at the exit from the combustion chamber 1 of the engine M, an exhaust gas manifold 7 connected to a path or pipe 8 for exhausting the gases. The exhaust circuit 2b also comprises a turbine 10, rotating as one with the inlet gas compressor 4, and therewith forming a turbocompressor. The turbine 10 is driven by the exhaust gases of the exhaust path 8, the flow of which is depicted schematically by the arrow F2.

Finally, the exhaust circuit 2b is connected to an exhaust gas recirculation circuit 2c comprising a line for guiding the recirculated exhaust gases ("EGR gases") in order to bleed exhaust gases from the exhaust circuit 2b, near the outlet thereof, and reinject them into the intake circuit 2a, in this instance upstream of the compressor 4, at a valve 9 which in this instance is a three-way valve 9 that will be referred to hereinafter as the EGR valve 9 and which forms the site or region of connection of the recirculation circuit 2c to the intake circuit 2a. Such exhaust gas recirculation is said to be low-pressure recirculation because it is performed on exhaust gases leaving the exhaust circuit 2b (downstream of the turbine 10) which are at a relatively low pressure. A cooler 12 for these recirculated exhaust gases is also provided in the recirculation circuit 2c. Those gases which are not recirculated form the exhaust gases of the vehicle, the flow of which gases is denoted by the arrow F3.

The EGR valve 9 has a charge air inlet port 9a (or duct 9a) an EGR gas inlet port 9b (or duct 9b) and a gas outlet port 9c (or duct 9c) for the gases which form the inlet gases (and the composition of which varies according to the flow rate of the gases from the air and EGR gas inlet ports 9a, 9b). The EGR valve 9 comprises a shutter 15 in its air inlet port 9a (hereinafter referred to as the "air shutter 15") and a shutter 16 in its EGR gas inlet port 9b (hereinafter referred to as the "EGR gas shutter 16"). Functionally, and as can be seen particularly clearly in FIGS. 2a to 2c, the EGR valve 9 therefore performs the function of two valves, one of them regulating the fresh air flow rate and the other the EGR gas flow rate.

The three modes of operation of the EGR valve 9 are set out hereinbelow in general terms, it being possible for the implementation of these modes of operation and, in particular, the ratio between the degrees of opening of the shutters 15, 16 to vary depending on the embodiment of the EGR valve 9.

Figure 2A:
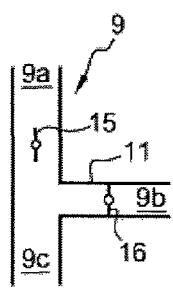
FIGS. 2a, 2b and 2c depict three modes of use of the EGR valve of FIG. 1.

In a first mode of operation of the EGR valve 9 which mode is depicted in FIG. 2a and corresponds to the engine M operating with no exhaust gas recirculation (of use, for example, if the engine is operating in a particularly cold environment), the air shutter 15 is open (wide open or partially open) and the EGR gas shutter 16 is closed, thus completely blocking off the recirculation line 11. Because the EGR gas shutter 16 is closed, the air shutter 15 can, in this first mode of operation, adopt any degree of opening between wide open and fully closed.

Figure 2B:
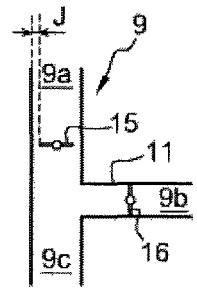

In a second mode of operation of the EGR valve 9, which mode is depicted in FIG. 2b and which corresponds to the start of operation of the engine M with exhaust gas recirculation, the two shutters 15, 16 are closed; such a mode of operation may typically be implemented when the engine is at low idle. According to the invention, the air shutter 15 is configured in such a way that its diameter is smaller than that of the line across which it extends in order to leave a clearance "J" between its edges and the internal surface of the wall of said line. This clearance J allows a leakage fresh air current to pass thus guaranteeing a minimum flow rate of air to the engine M to allow it to operate in this mode of operation of the EGR valve 9. The low flow rate of this leakage current is, in this instance, compensated for by the opening of the butterfly 17 that regulates the engine speed in order to guarantee a minimum flow rate sufficient for the engine M to operate.

Figure 2C:
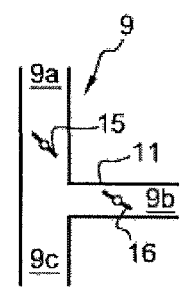

In a third mode of operation of the EGR valve 9, which mode is depicted in FIG. 2c and corresponds to the engine M operating with exhaust gas recirculation, the two shutters 15, 16 have been opened concomitantly from their position of simultaneous closure. Whatever the degree of opening of the two shutters 15, 16 in any particular EGR mode (it being possible for their respective levels of opening to be different), operation with exhaust gas recirculation has to be begun with the simultaneous closure of the two shutters 15, 16 (FIG. 2b) followed by their simultaneous opening. Because the two shutters 15, 16 are opened concomitantly from a position of simultaneous closure, the pressure difference across the EGR shutter 16 (which means the difference between the pressure upstream of the shutter 16 and the pressure downstream of the shutter 16) remains sufficiently great, whatever the degree of opening of the two shutters 15, 16, that it can be measured effectively using a pressure sensor that is not overly precise; typically, the pressure difference thus remains between 15 millibar and 200 millibar; and this pressure difference is measured using an upstream pressure sensor and a downstream pressure sensor, neither of which sensors has been depicted.

By virtue of the invention and the use of EGR by simultaneously opening the air valve 15 and the EGR gas valve 16 from their position of simultaneous closure, it is possible at light load (which means to say at low speed) to guarantee enough of a depression across the shutters that the pressure difference across them can be measured and the shutters therefore operated (in general, only the pressure difference across the EGR gas shutter 16 is measured. This being because the opening of the EGR gas shutter 16 in itself leads to a reduction in the pressure difference across it which is compensated for by the concomitant opening of the air shutter 15 which increases the flow rate and therefore increases the pressure difference. At heavier load, because the air shutter 15 is wide open or mostly open, enough of a fresh air flow rate to sustain the heavy load is guaranteed.

In the preferred embodiment of the invention that is set with reference to FIGS. 3, 6a, 6b, 6c and 6d, the EGR valve 9 comprises a single motor 18 for operating its two shutters 15, 16; in this instance it is a DC motor. The EGR valve 9 comprises gearing extending from the shaft 19 of the motor 18 as far as two drive shafts 20, 21 that drive the rotation of the air shutter 15 and of the EGR gas shutter 16 respectively. In this particular instance, these drive shafts 20, 21 are parallel to one another and to the shaft 19 of the motor 18.

Secured to the shaft 19 of the motor 18 is a pinion 22 that drives an intermediate gearwheel 23 bearing a peripheral toothset 24 and a central toothset 25 (these toothsets 24, 25 are superposed and concentric). The peripheral toothset 24 of the intermediate wheel 23 meshes with a ring gear 26 that drives the rotation of the air shutter 15. The central toothset 25 of the intermediate wheel 23 meshes with a ring gear 27 of a mechanism 28 for driving the rotation of the EGR gas shutter 16.

In the example considered, the motor 18, via its pinion 22, if driven in the counterclockwise direction, drives the intermediate wheel 23 in the clockwise direction. In its turn, the intermediate wheel 23, via its toothsets 24, 25, drives the ring gears 26, 27 that turn the two shutters 15, 16 in the counterclockwise direction.

The air shutter 15 is continuously driven in rotation by the rotation of its driving toothset 26, without ever being disengaged regardless of its position. When the toothset 26 is in the position of FIG. 6b, the air shutter 15 is open in the first mode of operation of the EGR valve 9, which means to say with the EGR gas shutter 16 closed (FIG. 2b). As its driving toothset 26 rotates in the counterclockwise direction, the air shutter 15 moves from its open position to its closed position (a rotation through 90°), which means to say into its position for the second mode of operation of the EGR valve 9 (FIG. 2b); if the motor 18 continues to rotate, the air shutter 15 continues to rotate and this results in it opening, but on the other side, up to an angle of 90° in the third mode of operation of the EGR valve 9 (FIG. 2c).

The mechanism 28 for driving the EGR gas shutter 16 comprises a disengagement system designed so that the rotation of the ring gear 27 does not cause the shaft 21 that drives the shutter 16 to turn over the first half of its travel (0-90°) but does rotate the same shaft over the second half of its travel (90°-180°). For this purpose, in this particular instance, the mechanism 28 comprises a wheel 29 bearing the ring gear and in which a circular disengagement slot 30 is formed. The mechanism 28 also comprises a disk 31 rotating as one with the drive shaft 21 of the shutter 16 and bearing a finger 32 designed to slide in the slot 31 between 0° and 90° and come into abutment against the end 33 of the slot between 90° and 180° so that the wheel 29 bearing the ring gear 27 can drive the disk 31 (and therefore the shutter 16).

Figure 6A:
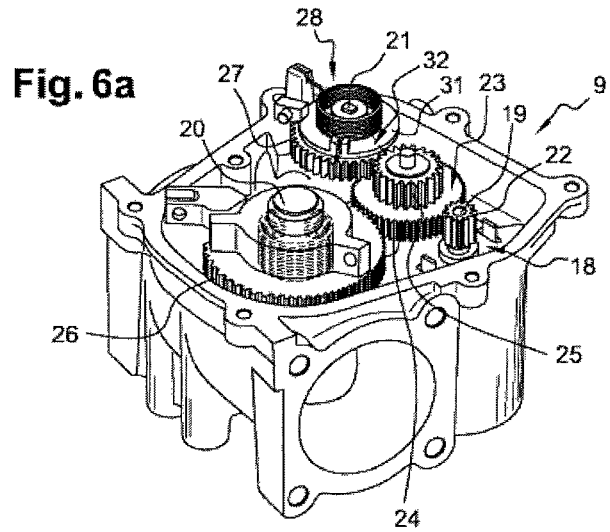
FIGS. 6a, 6b, 6c and 6d are depictions in perspective of the EGR valve of the first embodiment of the invention.
Figure 6B:
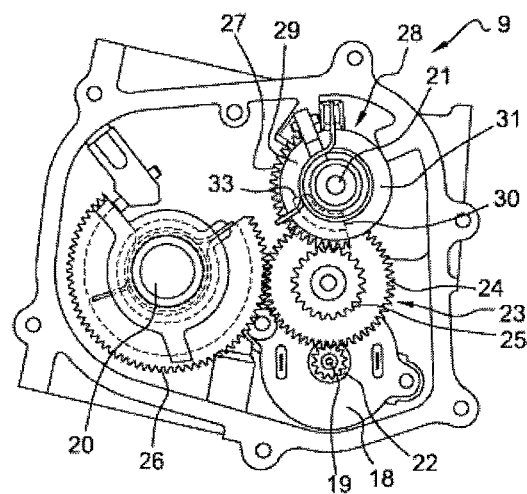
Figure 6C:
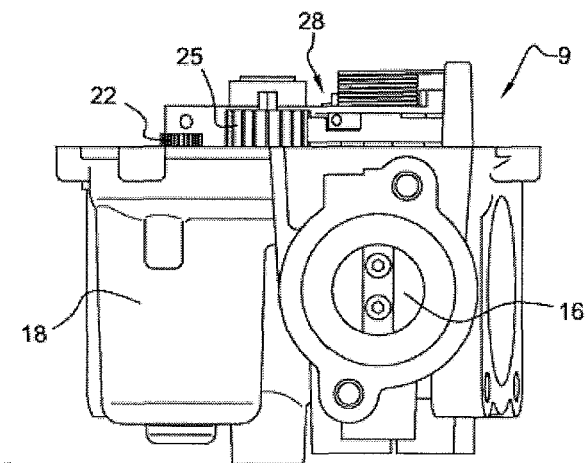
Figure 6D:
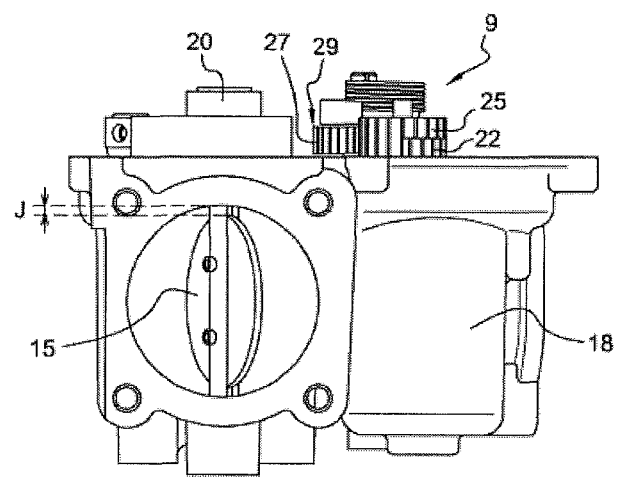

Thus, starting from the position of FIG. 6b (0°), the wheel 29 is made to turn in the counterclockwise direction and, until it has turned through 90°, this rotation leads to no movement of the shutter 16 because the slot 30 of the wheel 29 is sliding along the finger of the disk 31. From 90° onwards and if rotation continues, the end 33 of the slot 30 comes into abutment with the finger 32 and causes the latter to turn with the wheel 29, thus driving the rotation of the disk 31 and therefore of the shutter 16 from its closed position into its open position. Rotation in the opposite direction causes the shutter 16 to move in the opposite direction, which means to say causes it to rotate from its open position to its closed position from 180° up to 90°, but with no further movement from 90° to 0°.

Figure 3:
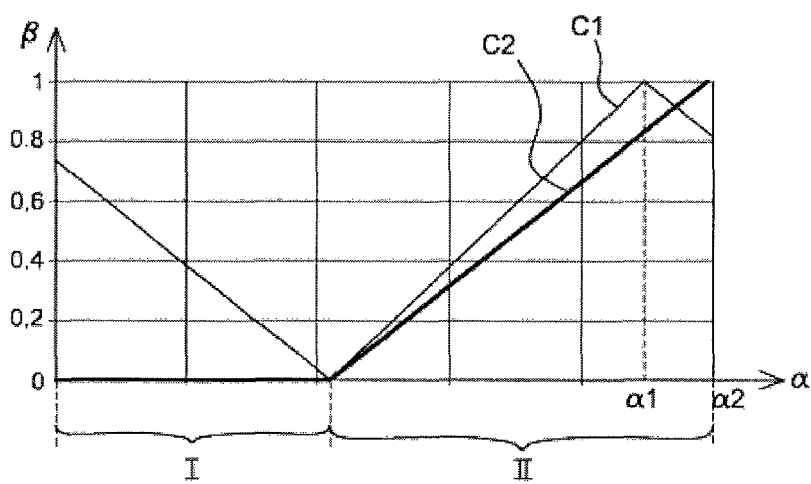
FIG. 3 is a depiction, in the form of a graph, of the position of the shutters of the EGR valve as a function of the angular position of their drive motor according to a first embodiment of the valve of the invention.

The dynamic law governing the driving of the shutters 15, 16 by the motor 18 is depicted by the graph of FIG. 3 which depicts the opening angle $\beta$ of the shutters 15, 16 (curve C1 for the air shutter 15 and curve C2 for the EGR gas shutter 16) as a function of the angle $\alpha$ of rotation of the shaft 19 of the motor 18.

As can be seen in FIG. 3, in a first region I, only the air shutter 15 is driven in rotation, from an open position to its fully closed position (the clearance J allowing a leakage air current to pass at its periphery in this position); the shutter 15 is driven from its closed position into an open position in the event of rotation in the opposite direction. In a second region II, the two shutters 15, 16 are both driven in a rotation concomitantly from their closed position to their open position (or vice versa if the rotation is in the opposite direction).

It will be noted that the concomitant opening of the shutters 15, 16 occurs, in the embodiment described, linearly as a function of the angle $\alpha$ of rotation of the shaft 19 of the motor 18, the degrees of opening of the shutters 15, 16 being substantially identical because the gradients of the curves C1, C2 are similar (but in this particular instance not entirely identical).

It will also be noted in this particular instance that there is an offset in the opening of the air shutter 15, the latter being designed to reach its wide open position at an angle $\alpha 1$ of the shaft 19 of the motor 18 which is smaller than the angle $\alpha 2$ corresponding to the EGR gas shutter 16 being wide open, the air shutter 15 continuing to rotate between these two angles $\alpha 1$ and $\alpha 2$ and therefore moving from its wide open position to a position of partial blocking when the EGR gas shutter 16 is in its wide open position. The combination of the EGR gas shutter 16 being wide open with the air shutter 15 being partially closed makes it possible to increase the level of EGR because the partial closure of the air shutter 15 leads to an EGR gas aspiration effect.

Of course, the gearing that drives the rotation of the shutters 15, 16 can be arranged differently in order to obtain particular opening dynamics for the shutters 15, 16, according to the desires of those skilled in the art.

Figure 4:
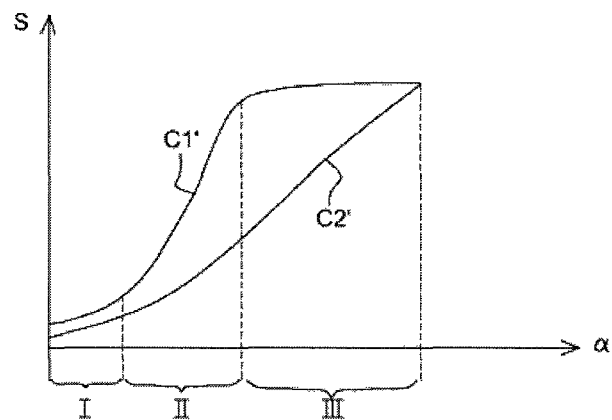
FIG. 4 is a depiction, in the form of a graph, of the bore section available to the gases at the shutters of the EGR valve as a function of the angular position of their drive motor according to a second embodiment of the valve of the invention.

One example of another possible dynamics of the shutters 15, 16 of a second embodiment of the EGR valve 9 is given with reference to FIG. 4 which is a graph representing, on the ordinate axis, the bore section S available to the gases at the shutters 15, 16 (curve C1' for the bore section available to the air at the air shutter 15, and curve C2' for the bore section available to the EGR gases 16 at the EGR gas shutter 16), as a function of the angle $\alpha$ of rotation of the shaft 19 of the motor 18. It will be noted that the curves are not straight-line portions as they were in FIG. 3, because the bore section is not a linear function of the angle $\alpha$ of the shaft 19 of the motor 18 (unlike the angle of rotation of the shutters 15, 16 which is a linear function thereof, directly dependent on the gear ratio).

Three main phases or modes of operation for the concomitant opening of the shutters 15, 16 of this EGR valve 9 will be noted:
- a first phase I in which the rotation of the motor 18 drives the opening or closing of the shutters 15, 16 to substantially identical degrees of opening;
- a second phase II in which the rotation of the motor 18 drives the opening or closing of the shutters 15, 16 with the first shutter 15 having a degree of opening greater than the degree of opening of the second shutter 16, and
- a third phase III in which the rotation of the motor 18 drives the opening or closing of the second shutter 16, the first shutter 15 being immobile and wide open.

The first two phases or region I, II are used for light or moderate loads on the engine M, in order to ensure a suitable level of EGR with a pressure difference across the EGR gas shutter 16 that allows it to be measured effectively. The third phase or region III is used for high loads on the engine M, to guarantee a maximum air flow rate. A person skilled in the art will adapt the gearing of the EGR valve 9 to obtain such dynamics; in particular, these opening dynamics for the opening of the shutters 15, 16, which are more complicated to obtain than those of the first embodiment of the valve 9, may advantageously be obtained using two valves 15, 16 which are controlled electronically.

Figure 5:
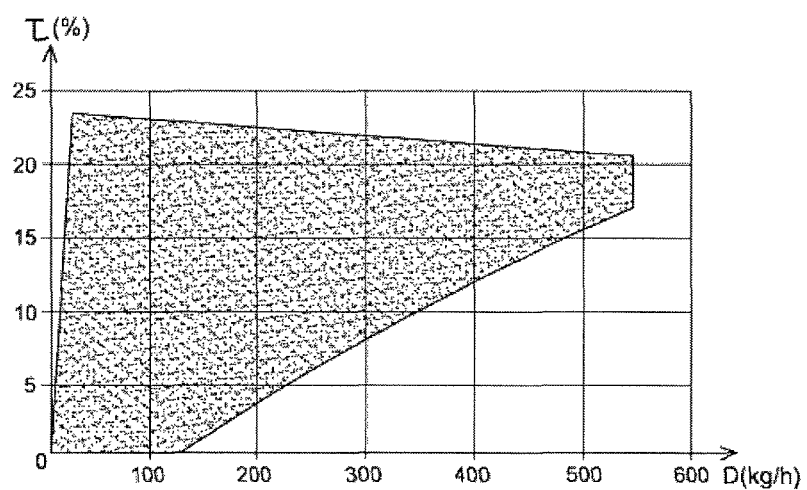
FIG. 5 is a graph depicting the permissible level of EGR as a function of inlet gas flow rate, i.e. as a function of engine speed.

FIG. 5 finally gives, for information purposes, a graph representing the level of EGR $\tau$ (in %, representing the ratio of the EGR gas flow rate to the total gas flow rate on the intake side of the engine M) as a function of this same gas flow rate D. The region corresponding to EGR levels $\tau$ that are admissible as a function of the flow rate D, which means to say as a function of the various speeds of the engine M are shaded gray. The dynamics of the EGR valve 9 allow the level of EGR $\tau$ to be set to a point in this region for each engine M speed.

The way in which the EGR valve 9 operates, (however it is embodied) is, incidentally, conventional, as is that of the engine M and its intake 2a, exhaust 2b and recirculation 2c circuits. All is regulated by the ECU thanks notably to the measuring of the pressure difference across the EGR shutter 16 which measurement is made possible and easier by the control method and the valve 9 of the invention.

The invention has been presented in relation to a valve fitted with shutters but the valve could of course be fitted with other shut-off means such as butterflies. Moreover, as was already envisioned earlier, the three-way valve could be replaced by two simple valves.

The invention has been described in relation to some preferred embodiments, but it goes without saying that other embodiments are conceivable. In particular, the features of the various embodiments described can be combined with one another, if there are no compatibility issues in so doing.

The invention claimed is:

1. A method of controlling an exhaust gas recirculation circuit of a motor vehicle internal combustion engine, the combustion engine being connected to an air intake circuit and to an exhaust gas circuit connected to the air intake circuit by the recirculation circuit, a first valve regulating the airflow rate upstream of the recirculation circuit and a second valve regulating the flow rate of recirculated exhaust gases in the recirculation circuit, the exhaust gas recirculation being controlled notably by measuring a pressure difference across the second valve, the method comprising:
   a) the first and second valves are closed, the first valve being arranged to allow, when in the closed position, an air leak current to pass,
   b) the first and second valves are opened concomitantly so as to create enough of a pressure difference across the second valve that this pressure difference can be measured.

2. The method as claimed in claim 1, in which the first and second valves are arranged in a three-way valve comprising an inlet port with the first valve, an inlet port with the second valve and an outlet port communicating directly or indirectly with an intake manifold that admits gas to the engine.

3. The method as claimed in claim 1, wherein the intake circuit comprises, downstream of the recirculation circuit, a third valve for regulating the flow rate of the gases admitted to the engine, said third valve being operated to compensate for the closure of the first valve.

4. The method as claimed in claim 1, wherein the degree of opening of the first valve is substantially identical to the degree of opening of the second valve.

5. The method as claimed in claim 1, further comprising three phases of operation for the concomitant opening of the valves, the three phases being defined as:
   a first phase in which the degree of opening of the first valve is substantially identical to the degree of opening of the second valve;
   a second phase in which the degree of opening of the first valve is greater than the degree of opening of the second valve, and
   a third phase in which the degree of opening of the first valve is constant and maximum for a plurality of possible degrees of opening of the second valve.

6. A three-way valve for implementing the control method of claim 1, the three-way valve being intended to provide the connection between the gas intake circuit and the exhaust gas recirculation circuit, the three-way valve comprising:
   a first shutter for regulating the airflow rate;
   a second shutter for regulating the recirculated exhaust gas flow rate;
   a single motor for driving the first and second shutters; and
   gearing connecting the motor to the first and second shutters in order to drive the first and second shutters, the gearing comprising means of driving the first shutter, means of driving the second shutter and means of disengaging the second shutter.

7. The valve as claimed in claim 6, having three modes of operation:
   a first mode of operation in which the motor drives the opening or closing of the first shutter, the second shutter being immobile and closed;
   a second mode of operation in which both shutters are closed, and
   a third mode of operation in which the motor drives the concomitant opening or closing of the two shutters.

8. The valve as claimed in claim 7, in which the concomitant opening or closing of the first and second shutters has three phases defined as:
   a first phase in which the rotation of the motor drives the opening or closing of the shutters to substantially identical degrees of opening;
   a second phase in which the rotation of the motor drives the opening or closing of the shutters with the first shutter having a degree of opening greater than the degree of opening of the second shutter, and
   a third phase in which the rotation of the motor drives the opening or closing of the second shutter, the first shutter being immobile and wide open.

9. A motor vehicle internal combustion engine comprising a valve as claimed in claim 6.

* * * * *